July 8, 1924.
J. R. HOWARD
PLUMB BOB
Filed Oct. 16, 1923
1,500,938
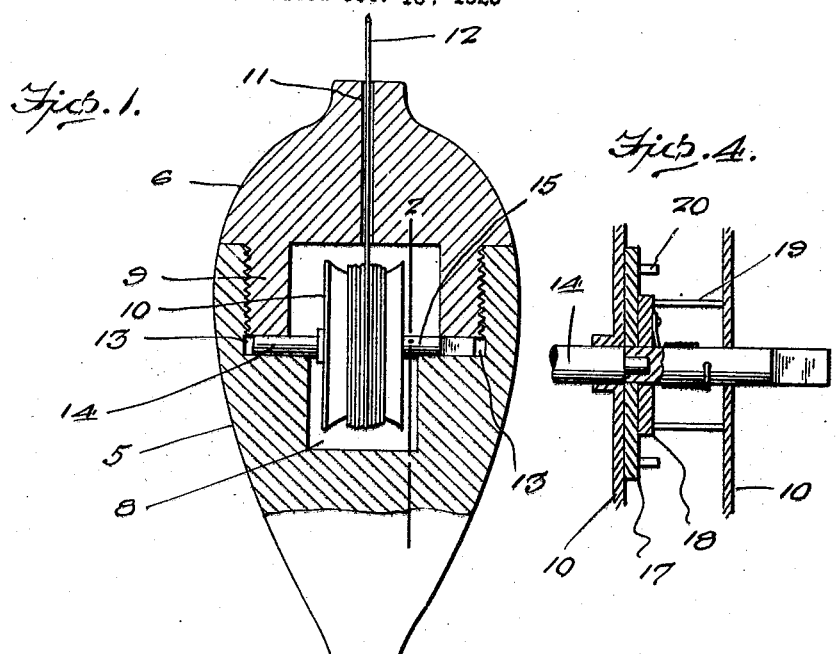
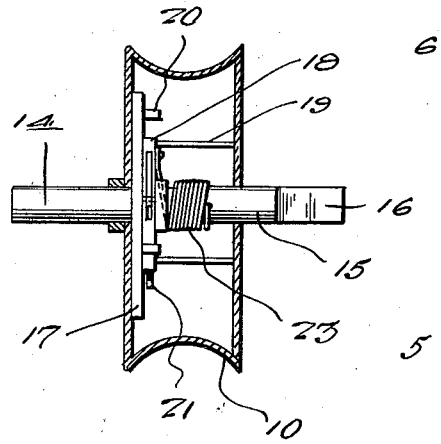
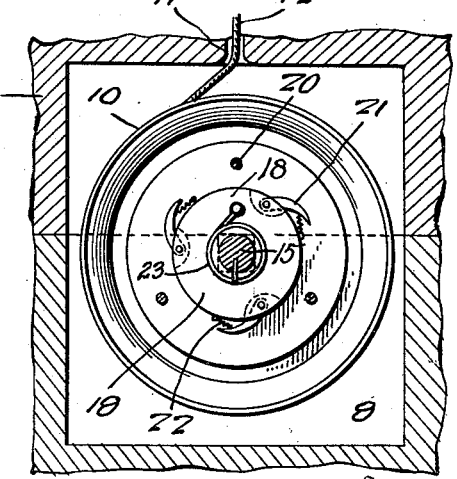
Witnesses:
Inventor
J. R. Howard
By
Attorney Patented July 8, 1924.

1,500,938

UNITED STATES PATENT OFFICE.

JOHN R. HOWARD, OF REDWOOD CITY, CALIFORNIA, ASSIGNOR OF ONE-FOURTH TO DAISY FANNING, OF COOPERSTOWN, NEW YORK.

PLUMB BOB.

Application filed October 16, 1923. Serial No. 668,884.

*To all whom it may concern:*

Be it known that I, JOHN R. HOWARD, citizen of the United States, residing at Redwood City, in the county of San Mateo and State of California, have invented certain new and useful Improvements in Plumb Bobs, of which the following is a specification.

This invention relates to plumb bods and has particular reference to plumb bobs of the pendulum type, which embody a reeling feature.

Objects of the invention are to provide a plumb bob with a spring drum upon which the line or cord is automatically wound, when the weight of the bob is relieved from the line or cord, to provide means for automatically preventing unwinding of an undue amount of cord from the reel or drum whereby slack in the cord or line is eliminated, and to automatically release this slack preventing means upon relieving the cord or line from the weight of the bob, whereby the spring of the drum or reel may automatically wind the cord thereon.

A further object is to generally simplify and improve devices of the above kind, whereby the same may meet with all of the requirements for a successful commercial use.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views:

Figure 1 is a view partly in central vertical section and partly in side elevation, of a plumb bob constructed in accordance with the present invention.

Figure 2 is a fragmentary enlarged vertical sectional view, taken on the line 2—2 of Figure 1, with one wall of the drum or reel removed to reveal details of the invention.

Figure 3 is a substantially central sectional view of the reel device, and

Figure 4 is a fragmentary sectional view, somewhat similar to Figure 3, but with other parts shown in section to reveal still further details of the invention.

Referring more in detail to the drawing, the present bob or weight is preferably of the usual substantially conoidal shape or form and constructed of a lower section 5 and an upper section 6 that are suitably detachably connected, the lower section 5 being provided upon its lower end with the usual contact point 7. The lower section 5 of the bob is provided with a socket 8 in the upper end thereof, the upper portion of which is enlarged and has its circular wall threaded for screw threaded reception of the externally threaded annular flange 9 that is provided upon the bottom of the upper section 6. The space within the flange 9 of the upper section 6 thus cooperates with the lower portion of the socket 8 to form a chamber within which a spring drum or reel 10 is mounted, the upper section 6 of the bob being provided with a central longitudinal opening 11 through which the usual line or cord 12 extends upwardly from the drum or reel 10.

By enlarging the upper portion of the socket 8, a shoulder is presented at a point between the two portions of said socket or at the bottom of the enlarged portion of the latter, and a pair of transversely aligned opposed grooves 13 are provided in this shoulder and are preferably of angular form, as indicated by dotted lines in Figure 2, for a purpose which will presently become apparent.

The reeling mechanism comprises a shaft embodying a rotatable section 14, the outer end of which is rotatably disposed in one of the grooves 13 and a non-rotatable section 15, the outer section of which is squared, as indicated at 16 and fitted in the other groove 13 so as to be held against rotation. The shaft sections are telescopically associated at their inner ends in such manner as to permit free rotation of the section 14 relative to the shaft section 15, and one manner of accomplishing this is to provide a cylindrical reduced portion upon the inner end of the shaft section 14 that rotatably engages in a cylindrical socket provided in the inner end of the shaft section 15 as shown in Figure 4. The drum 10 is suitably fixed to the inner end portion of the shaft section 14 and rotatable upon the intermediate portion of the shaft section 15 upon the inner end of which is secured a disc 17 arranged between one side wall of the drum 10, and another relatively smaller disc 18 that is rotatably mounted upon the non-rotatable shaft section 15, said disc 18 being connected with the drum 10 so as to rotate therewith by any suitable means, such as transverse rods or pins 19.

A plurality of pins 20 are fixed to the disc 17 so as to extend laterally and inwardly of the latter, and a plurality of pawls 21 are pivoted to the smaller disc 18 for swinging outwardly in the path of the pins 20. The pawls 21 are normally held in inwardly swung position as shown in Figure 2, inwardly of the pins 20 by means of suitable springs 22 that are of such strength as to permit outward swinging movement of the pawls 21 by centrifugal action upon rotation of the disc 18 attaining a predetermined value. Coiled about the shaft section 15 is a spring 23, one end of which is attached to the disc 18 and the other end of which is attached to the shaft section 15 for causing rotation of the drum 10 in a direction to cause winding of the cord 12 thereon, it being noted that the effective action of the pawls 21 is in a reverse direction to the direction in which the drum 10 is rotated, when the cord 12 is wound thereon.

In operation, the inner end of the cord 12 is suitably secured to the rim of the drum 10 and the other end of the cord is held in the hand. When the bob or weight is allowed to fall, the weight thereof will overcome the action of the spring 23 so as to cause rotation of the drum 10 in opposition thereto and allow the cord 12 to unwind therefrom. When this takes place, spring 23 is wound tighter and upon the rapid dropping of the bob the spool or drum 10 attains a speed of rotation sufficient to cause outward swinging movement of the pawls 21 under the influence of centrifugal force due to the fact that the disc 18 which carries said pawls 21 is connected with the drum 10. When the pawls 21 swing outwardly, they will engage the pins 20 of the disc 17 so as to arrest rotation of the drum 10 and preventing further dropping movement of the bob in such manner as to prevent the occurrence of slack in the lines or cord 12. As soon as the weight of the bob is relieved from the cord 12 by allowing said bob to come in contact with a supporting surface, the spring 23 will rotate the drum 10 in a reverse direction for winding the cord 12 thereon, and when this takes place, the pawls 21 are disengaged from the pins 20 and automatically swung inwardly to released position under the influence of the springs 22.

From the above, it will be seen that I have provided a plumb bob of extremely simple and durable construction and which embodies means for effectively preventing the occurrence of slack in the suspension cord or line thereof as well as means for preventing unwinding of the cord when the bob is lowered to the desired extent and out of contact with a supporting surface, which latter means is automatically releasable upon relieving the cord of the weight of the bob and permits rewinding of the cord upon the drum at this time.

Minor changes may be made without departing from the spirit and scope of the invention as claimed.

What I claim as new is:

1. A plumb bob having a drum rotatably mounted therein, a spring for rotating said drum in one direction to wind a plumb line thereon, centrifugally operable means for arresting rotation of said drum in its opposite unwinding movement upon the rotation of the drum in the last mentioned direction attaining a predetermined speed, said last named means being operable to maintain the drum against rotation for preventing unwinding of the plumb line from the drum when the plumb bob is out of contact with the supporting surface and its weight imposed upon said line, whereby the occurrence of slack in the line is prevented, means to automatically release said arresting means upon relieving the plumb line of the weight of said bob, said bob comprising upper and lower sections detachably joined, the lower section having transversely aligned grooves, and means for mounting the drum within the bob embodying a transverse shaft having its ends removably seated in said grooves respectively.

2. A plumb bob having a drum rotatably mounted therein, a spring for rotating said drum in one direction to wind a plumb line thereon, centrifugally operable means for arresting rotation of said drum in its opposite unwinding movement upon the rotation of the drum in the last mentioned direction attaining a predetermined speed, said last named means being operable to maintain the drum against rotation for preventing unwinding of the plumb line from the drum when the plumb bob is out of contact with the supporting surface and its weight imposed upon said line, whereby the occurrence of slack in the line is prevented, means to automatically release said arresting means upon relieving the plumb line of the weight of said bob, said bob comprising upper and lower sections detachably joined, the lower section having transversely aligned grooves, means for mounting the drum within the bob embodying a transverse shaft having its ends removably seated in said grooves respectively, the means for detachably joining the sections of the bob comprising a flange upon the upper bob section engageable with the ends of said shaft for preventing upward displacement of the latter from the grooves when the bob sections are joined.

In testimony whereof I affix my signature.

JOHN R. HOWARD.